C. T. BOYER.
FRUIT HOLDING TRAY.
APPLICATION FILED JUNE 12, 1916.
1,250,954.
Patented Dec. 25, 1917.
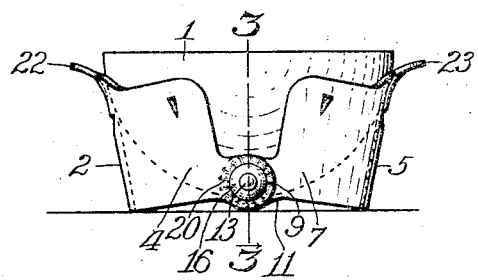
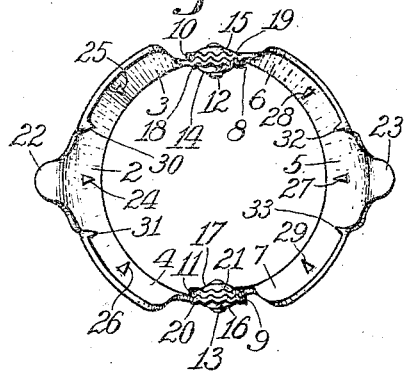
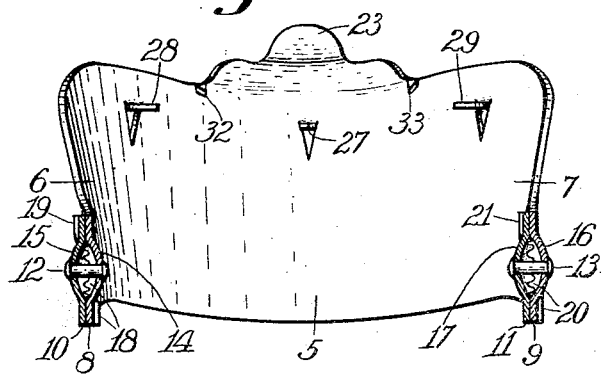
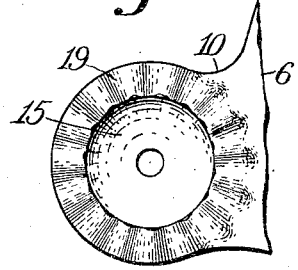
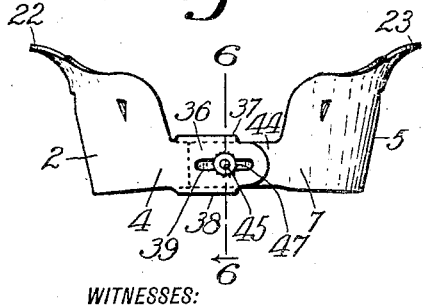
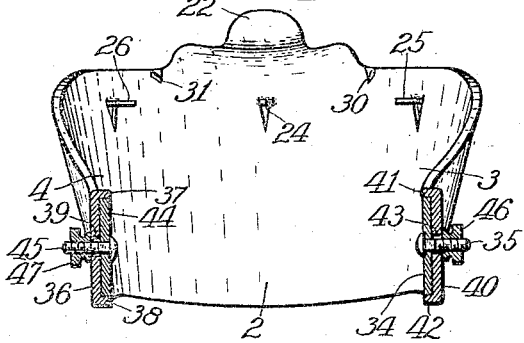
WITNESSES:
J. H. Gardner.
Myrtle McCoy.
INVENTOR:
Charles T. Boyer,
BY
E. T. Silvius,
ATTORNEY.

UNITED STATES PATENT OFFICE.

CHARLES T. BOYER, OF INDIANAPOLIS, INDIANA.

FRUIT-HOLDING TRAY.

1,250,954.  Specification of Letters Patent.  Patented Dec. 25, 1917.

Application filed June 12, 1916. Serial No. 103,206.

*To all whom it may concern:*

Be it known that I, CHARLES T. BOYER, a citizen of the United States, residing at Indianapolis, in the county of Marion and State of Indiana, have invented a new and useful Fruit-Holding Tray, of which the following is a specification, reference being had to the accompanying drawings and to the letters and figures of reference marked thereon.

This invention relates to a tray that is designed to steadily hold a piece of fruit of the character that is usually served ready to be eaten, the invention having reference more particularly to a tray whereby the half portion of a grapefruit, an orange or other fruit may be securely held in proper position for using a spoon to remove the juice or pulp from the fruit.

An object of the invention is to provide a fruit-holding tray of such construction as to be capable of securely holding a piece of fruit while being eaten by means of a spoon, and which shall be simple so as to be cheaply produced and easily cared for. Another object is to provide a tray of the above-mentioned character that shall be so constructed as to be adjustable to support and securely hold different sizes of pieces of fruit, to prevent the piece from rolling or tilting over when served or while being eaten. A still further object is to provide a sanitary fruit-holding tray that shall be so constructed as to be adapted to be readily held securely in different positions while the substance of the fruit is being removed from the rind or shell of the fruit; which tray may also be so constructed as to be ornamental and attractive in appearance as well as durable and economical in use.

With the above-mentioned and other objects in view, the invention consists in a segmental shell-like tray, the segments of which are adjustable relatively to each other and provided with spurs for engaging and holding a piece of fruit in the tray; the invention consisting further in the parts and combinations and arrangements of parts as hereinafter particularly described and further defined in the accompanying claims.

Referring to the drawings, Figure 1 is an elevation of the fruit-holding tray and a piece of the fruit therein; Fig. 2 is a top plan of the improved tray; Fig. 3 is a sectional elevation of the improved tray on the line 3—3 of Fig. 1; Fig. 4 is a fragmentary detail of one of the parts of the tray on an enlarged scale; Fig. 5 is an elevation of the improved tray slightly modified, and Fig. 6 is a sectional elevation on an enlarged scale on the line 6—6 of Fig. 5.

Similar reference characters on the various figures of the drawings indicate like parts or features of construction herein referred to.

In the drawings the numeral 1 indicates a piece or half part of a grapefruit or an orange arranged with its cut surface uppermost, in which position the tray is required to hold the piece so that the latter shall retain its juice until removed by means of a spoon. The improved tray comprises two principal parts that are connected together so as to be movable each with respect to the other to afford adjustability, the parts preferably being composed of suitable sheet metal. One part comprises a middle portion 2 and side portions 3 and 4, the companion part comprising a middle portion 5 and side portions 6 and 7. The parts are curved to form segments which connected together constitute an approximately circular ring of generally cup-like form adapted to embrace the piece of fruit. The metal preferably is sufficiently thin and elastic to permit it to yield slightly so as to conform to the contour of the piece of fruit. Preferably the two parts are hingedly connected together to afford adjustability and in such case the side portions of one part have projecting ears 8 and 9, the companion part having ears 10 and 11 arranged in contact with the ears 8 and 9 respectively and connected thereto by means of pivots 12 and 13 respectively. Preferably the ears 8 and 10 are dished and arranged with their concave faces inward, so that they have elastic contact portions 14 and 15, the ears 9 and 11 likewise having elastic contact portions 16 and 17 respectively. The pivots have heads that bear against the outside of the dished portions, so that the ears of the two parts have frictional contact to hold them in adjusted position. In order to more securely hold the two segments of the tray in adjusted position the ears 8 and 10 have circular series of radial corrugations 18 and 19 respectively, the ears 9 and 11 having similar corrugations 20 and 21 in coöperative arrangement. The middle portion of one segment has a handle 22 on the top thereof, the middle portion of the companion segment having a handle 23 on its top, the handles being conveniently arranged to be held by one hand of the person or to be engaged by both hands when adjusting the segments of the tray.

In some cases the inside of one segment of the tray is provided with projecting spurs 24, 25 and 26, the opposite segment being similarly provided with spurs 27, 28 and 29 adapted to be forced into the piece of fruit and securely hold it from being forced upwardly out of the holder, the spurs being arranged below the tops of the segments. Preferably one segment is provided also at the top thereof with inwardly-projecting spurs 30 and 31, the opposite segment being likewise provided with spurs 32 and 33. Each spur preferably is formed of a portion of the metal stamped out and appropriately bent to the required position relatively to the inner face of the segment. Constructed as above described the two segments of the tray are identically alike and connected together in relatively reversed position. In the slightly modified form of construction the main portions of the segments of the tray are constructed as above described, but instead of being hingedly connected together are otherwise adjustably connected without affecting the result of operation, in which case one side portion of one segment has an ear 34 provided with a clamp bolt 35, the opposite side portion of the segment having an ear 36 provided with guides 37 and 38 and a centrally arranged horizontal slot 39. One side portion of the opposite segment has an ear 40 provided with guides 41 and 42 between which the ear 34 is guided, the ear 40 having also a central horizontal slot 43 therein that receives the clamp bolt 35; and, the opposite side portion of the segment has an ear 44 similar to the ear 34 and provided with a clamp bolt 45 that extends through the slot 39, the ear 44 being guided between the guides 37 and 38. The ears of each of the segments are like those of the other but reversedly arranged and are adapted for relatively longitudinal sliding engagement. The clamp bolts 35 and 45 are provided with thumb nuts 46 and 47 respectively for securely holding the ears of the two segments tightly together when adjusted.

In practical use a grapefruit, an orange or such fruit as may be desired is cut into halves as is customary when it is desired to remove the substance of the fruit from its rind or skin, and the piece of fruit is placed between the segments of the tray so as to be conveniently accessible, the segments being relatively spread apart or moved closer together in order to adjust the tray to the particular size and hemispherical portion of the piece of fruit, the segments being pressed by hand sufficiently to force the spurs thereof into the exterior of the piece. In case the binding-screws are provided as above mentioned they obviously are properly manipulated in the adjustment of the tray. The tray carrying the piece of fruit is usually placed upon a plate or dish to be served, and while the fruit is being eaten the person eating the fruit may grasp either one or both of the handles of the tray and firmly hold the latter in position while forcedly extracting the juice or pulp from the piece of fruit by means of a spoon.

Having thus described the invention, what is claimed as new is—

1. An adjustable fruit-holding tray including two curved self-supporting embracing parts having two adjustable tension connections each with the other above the bottoms of the parts, the parts normally standing on their bottoms, the main portions of the parts extending upwardly and divergently each relatively to the other.

2. An adjustable fruit-holding tray including two curved parts having two adjustable tension connections each with the other above the normal bottoms of the parts, the parts being adapted to stand directly on their bottoms, and spurs on the concave portion of each of the two parts.

3. An adjustable fruit-holding tray including two curved embracing parts normally standing in relatively opposite arrangement and having two adjustable connections each with the other, each connection having a friction tension device, the main portions of the parts extending upwardly and divergently and having each a relatively angular handle on the convex portion thereof, and spurs on the concave portions of the two parts.

4. A fruit-holding tray including two curved parts arranged with their concave faces opposed each to the other and adapted to stand on their bottoms, each of the parts having two horizontally extending connecting-ears on the ends of the normal lower portions thereof, the ears of the two parts being in adjustable frictional contact each with the other, and means connecting the ears of the two parts together above the plane of the bottom of the parts and frictionally holding the ears of each part to the ears of the other part in adjusted position.

5. A fruit-holding tray comprising two segmental parts oppositely arranged to form an embracing-ring, each part having two connecting-ears that are dished and corrugated and adjustably arranged in engagement with the connecting-ears of the opposite part, pivots connecting the connecting-ears of the two parts together, spurs on the inner faces of the two parts, and handles on the tops of the middle portions of the two parts respectively and projecting outwardly therefrom.

6. An adjustable fruit-holding tray having a substantially cup-shaped form, the tray including two principal curved embracing parts normally standing on their lower ends in relatively opposite arrangement, each part having two horizontally extending portions adjustably connected with the like portions of the opposite part, the main portions of the parts extending upwardly and divergently and having each a relatively angular handle on the top of the middle of the convex portion thereof.

In testimony whereof, I affix my signature in presence of two witnesses.

CHARLES T. BOYER.

Witnesses:
 E. T. SILVIUS,
 J. H. GARDNER.

Copies of this patent may be obtained for five cents each, by addressing the "Commissioner of Patents, Washington, D. C."